Patented Dec. 27, 1927.

1,654,114

UNITED STATES PATENT OFFICE.

TENNEY L. DAVIS, OF SOMERVILLE, MASSACHUSETTS.

COLLOIDING AGENT FOR NITROCELLULOSE.

No Drawing. Application filed April 25, 1922. Serial No. 556,526.

(GRANTED UNDER THE ACT OF MARCH 3, 1883; 22 STAT. L. 625.)

The invention described herein may be used by the Government, or any of its officers or employees in prosecution of work for the Government, or by any other person in the United States, without payment to me of any royalty thereon.

The subject of this invention is colloiding agents for nitrocellulose.

The main objects of this invention are the provision of colloiding agents capable of being prepared easily from cheap material; that form excellent solvents for nitrocellulose; the physical properties of which are, namely, that they are readily melted and easily soluble being soluble in most organic solvents, rendering them especially suitable for the various purposes for which colloiding agents for nitrocellulose are useful.

Specifically, my invention consists in the use of symmetrically substituted dialkyl ureas either with or without other substituent groups. By this is meant that two at least of the hydrogen atoms of urea, two symmetrically disposed with reference to each other shall be substituted by alkyl groups, that is, aliphatic radicles.

In the art as practiced at present, the urea derivatives which are widely used are sym-dimethyldiphenylurea, known as "centralite," and sym-diethyldiphenylurea, prepared technically by the interaction of phosgene respectively, with monomethylaniline and with monoethylaniline. Since the urea derivatives now in use contain aromatic groups it is thought that the use of urea derivatives which contain two symmetrically disposed aliphatic groups, either with or without other groups, constitutes a definite and considerable change of practice. It is claimed also that these aliphatic ureas are an improvement since they are readily melted and easily soluble, being more readily soluble in the usual solvents, and easily prepared from materials which are cheaper and more abundant.

Colloiding agents for nitrocellulose are used in the celluloid industry as tougheners and as a substitute for camphor. In the explosive industry they are used in the manufacture of colloided smokeless powder, either incorporated throughout the mass of the grain, where they function by toughening the grain and reducing the rapidity and temperature of its combustion (they may also function as stabilizers), or applied to the surface of the grain as a coating where they produce a skin less pervious to moisture than the surface of ordinary powder and of slower rate of burning than the interior of the powder grain.

I have experimented with a large number of urea derivatives and find that aromatic substituted ureas are not good solvents for nitrocellulose unless the total number of aromatic groups is at least three. From this observation it may be inferred that the sym-dimethyldiphenylurea and sym-diethyldiphenylurea which are so widely used do not owe their solvent property in any great measure to the two aromatic groups which they contain. Moreover trisubstituted aromatic ureas are generally high melting substances of limited solubility in most organic solvents.

I find that sym-dimethylurea and sym-diethylurea are slightly better solvents for nitrocellulose weight for weight than similar substances containing two phenyl groups in the molecule. The solvent action of symmetrically substituted dialkyl ureas remains even if other groups, aliphatic or aromatic, are substituted in the molecule. With an increase in the size of the alkyl groups the solvent action of the substance is improved.

I claim:

1. A process for collodizing nitrocellulose, consisting in treating nitrocellulose with a urea derivative consisting of at least two alkyl groups symmetrically substituted in the molecule.

2. A plastic composition including nitrocellulose colloided with a urea derivative consisting of at least two alkyl groups symmetrically substituted in the molecule.

3. A composition of matter including, as ingredients, nitrocellulose and a urea derivative consisting of at least two alkyl groups symmetrically substituted in the molecule.

TENNEY L. DAVIS.